(12) United States Patent
Taneda (10) Patent No.: US 6,215,572 B1
(45) Date of Patent: Apr. 10, 2001

(54) WAVELENGTH DIVISION MULTIPLEXING OPTICAL TRANSMISSION APPARATUS

(75) Inventor: Yasuhisa Taneda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/064,323

(22) Filed: Apr. 22, 1998

(30) Foreign Application Priority Data

Apr. 25, 1997 (JP) .................................................... 9-109325

(51) Int. Cl.[7] .......................... H04B 10/02; H04B 10/08; H04B 10/16; H04J 14/02
(52) U.S. Cl. ......................... 359/177; 359/124; 359/110; 359/179; 359/127
(58) Field of Search .................................... 359/177, 179, 359/124, 110, 127

(56) References Cited

U.S. PATENT DOCUMENTS

| 5,680,246 | * | 10/1997 | Takahashi et al. | .................... 359/341 |
| 5,900,959 | * | 5/1999 | Noda et al. | .......................... 359/180 |
| 5,920,414 | * | 7/1999 | Miyachi et al. | ..................... 359/133 |

FOREIGN PATENT DOCUMENTS

| 0336308 | 10/1989 | (EP) . |
| 0829935 | 3/1998 | (EP) . |
| 8082554 | 3/1996 | (JP) . |
| 8097775 | 4/1996 | (JP) . |
| 8293853 | 11/1996 | (JP) . |

OTHER PUBLICATIONS

Gambini P et al: "Laser Frequency Stabilization For High Bit–Rate FSK Multichannel Coherent Systems" Proceedings Of The Global Telecommunications Conference And Exhibition (Globecom), US, New York, IEEE, vol. –, 1989, pp. 473–477, XP000041550 * p. 473, left–hand column paragraph 1 *, * p. 474, right–hand column, paragraph 6 –p. 475, paragraph 1; figure 1 *.

Maeda M W et al.: "Absolute Frequency Identification And Stabilisation Of DFB Lasers In 1.5 M Region" Electronics Letters, GB, IEE Stevenage, vol. 25, No. 1, Jan. 5, 1989, pp. 9–11, XP000081500 ISSN: 0013–5194 * p. 9, right–hand column, paragraph 1 –p. 10, left–hand column, paragraph 5; figure 1 *.

(List continued on next page.)

Primary Examiner—Jason Chan
Assistant Examiner—M. R. Sedighian
(74) Attorney, Agent, or Firm—Ostrolenk, Faber, Gerb & Soffen, LLP (57) ABSTRACT

Light signals having different oscillation wavelengths issued from a plurality of light sources are optically modulated and combined into a combined light signal to be later transmitted. The combined light signal is partly passed through an optical band pass filter and then sent to an optical detector so that the optical detector detects input timing of the light signals of the respective wavelengths in the combined light signal. A driving voltage detection circuit detects a voltage value of a driving electric signal corresponding to an output detection pulse of the optical detector to associate the respective wavelengths of the light signals with the corresponding voltage values. When a comparator finds a difference between the voltage values of the adjacent wavelengths and judges that the difference is smaller than a set value, an alarm generator issues an alarm indicating that the wavelengths are close. A control circuit holds as a reference the voltage value of the first period corresponding to the wavelength of specific reference one of the light sources, and controls the oscillation wavelength of the light signal of the reference light source to be always constant by feeding the voltage value of the subsequent period corresponding to the wavelength of the reference light source back to the control circuit for monitoring.

7 Claims, 7 Drawing Sheets

OTHER PUBLICATIONS

Mizuochi T et al: Frequency Stabilized 622–MB/S 16–Channel Optical FDM System And Its Performance In 1.3/1.55–Mum Zero–Dispersion Fiber Transmission: Journal Of Lightwave Technology, US, IEEE. New York, vol. 13, No. 10, Oct. 1995, pp. 1937–1947, XP000596071, ISSN: 0733–8724, * p. 1938, left–hand column, paragraph 2 – right–hand column, paragraph 1; figures 2,3 *.

Vezzoni E et al: "laser Frequency Stabilization Techniques For Optical Communications" Proceedings Of The European Conference On Optical Communication (ECOC), NL, Amersfoort, PTT, vol. CONF. 16, 1990 pp. 943–950, XP000436525, * p. 944, paragraph 3 –p. 947, paragraph 1; figures 1, 5, 6 *.

* cited by examiner

WAVELENGTH DIVISION MULTIPLEXING OPTICAL TRANSMISSION APPARATUS

BACKGROUND OF THE INVENTION

1. Field of the Invention

The present invention relates to an optical transmission technique in an optical communication system and more particularly, to a wavelength division multiplexing optical transmission apparatus which modulates light outputs of a plurality of light emitting elements whose optical wavelengths are shifted mutually slightly with individual electric signals to obtain light signals, and which combines these light signals into a single light transmission signal to be transmitted onto a single optical fiber cable.

2. Description of the Related Art

Active researches have been conducted on increase in the transmission capacity of an optical fiber communication system. An optical transmitter in an optical communication transmission system generally inputs a digital electric signal to a light intensity modulator to modulate light intensity of a continuous wave (CW) light signal received from a laser light source and to transmit the modulated light signal onto a transmission line. In order to increase the transmission capacity, it is necessary to perform the light intensity modulation at high speed. However, when the above object is tried to be realized only by improvement in driving frequency bands of IC and optical device, its limit is expected. To avoid this limitation, various methods have been suggested. Among them, in particular, a wavelength division multiplexing (WDM) system using a plurality of light sources having respective different oscillation wavelengths is drawing attention as a promising means in future. One of such prior art wavelength division multiplexing systems will be explained below.

Figure 1:
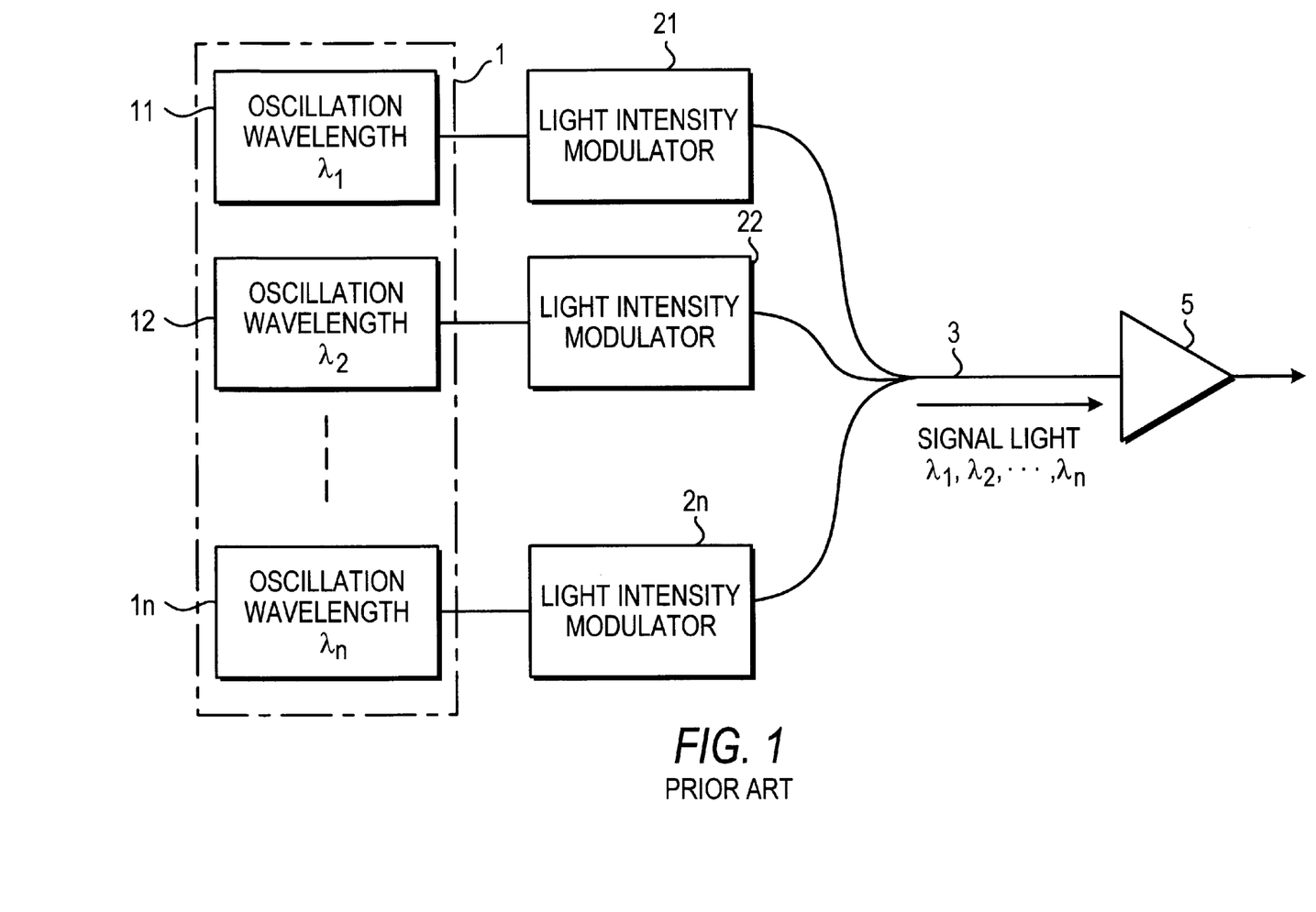
FIG. 1 shows an example of the arrangement of a prior art wavelength division multiplexing optical transmission apparatus.

FIG. 1 shows an example of arrangement of a prior art wavelength division multiplexing system. In the arrangement, n light sources 11 to 11n have different oscillation wavelengths of $\lambda_1$ to $\lambda_n$, respectively. To realize stabilization in oscillation wavelengths of the light sources, temperature control of a laser chip and fine adjustment of laser resonators in their intervals are carried out. Light intensity modulators 21 to 2n are provided which correspond to light signals of light sources 11 to 11n, respectively, to obtain data-modulated output light signals. All of these output light signals are combined by optical coupler 3, amplified by optical amplifier 5, and then sent onto a transmission line.

In the wavelength division multiplexing system, the intervals of the oscillation wavelengths of the respective light sources becomes one of important factors. When the light signals received from the respective light sources are different in light powers, a light receiver cannot transmit the light signals correctly. To avoid this, it is necessary to set the light signals within a wavelength region where the amplification factor of the optical amplifiers of the light transmitters is substantially constant; therefore the region of the light signal wavelengths is limited. For the purpose of realizing a wavelength division multiplexing system of a large capacity, it is only required to transmit a multiplicity of light signals having different wavelengths included in the limited light signal wavelength region. However, when the wavelength intervals are too narrow, a nonlinear effect within an optical fiber involves noise generation and a transmission distance must be inevitably set to be short. Further, even when an accurate optical filter is used in the light receiver, it becomes difficult to identify the wavelengths of the light signals, thus disabling the data reception.

For the purpose of make equal the light receiving powers of the respective light signals in the light receiver, there is a pre-emphasis method for providing previously-different powers for the signal light sources to overcome the unequal gain among the optical amplifiers. In this case, it becomes possible to transmit more light signals by enlarging the light signal wavelength range, the wavelength intervals being kept constant. However, this also involves another problem that the unequal gain of the optical amplifier caused by fluctuations of the oscillation wavelength unfavorably affects its output power or that, when the light receiver employs a fixed-type optical filter, this causes deterioration of signal receiving characteristics.

SUMMARY OF THE INVENTION

It is therefore an object of the present invention to provide a stable wavelength division multiplexing optical transmission apparatus which, in order to solve the above problems in the prior art, can realize additional stabilization of oscillation wavelengths of light of a plurality of light sources while avoiding overlapping of the wavelengths of the light from the light sources.

In accordance with an aspect of the present invention, the above object is attained by providing a wavelength division multiplexing optical transmission apparatus for modulating light emitted from a plurality of light sources having different oscillation wavelengths with individual electric signals with respect to light intensity, combining these light signals into a single combined light signal and then transmitting the combined light signal onto a transmission line, wherein one of these light sources is used as a reference light source, a voltage value corresponding to the wavelength of the reference light source is always monitored to control the oscillation wavelength of the reference light source to be always constant.

That is, the combined light signal is sent to an optical coupler and then partly branched therefrom into an optical band pass filter. The optical band pass filter has a function of determining a wavelength of a transmitted light signal according to the driving voltage value of a driving electric signal externally supplied thereto, and is able to pass therethrough light signals each having a single wavelength from the combined light signal received from the optical coupler in a predetermined wavelength order of all the wavelengths according to the driving voltage value of the periodically-varying driving electric signal. Next, an optical detector, when received the transmitted light signal (of the single wavelength) from the optical band pass filter, photoelectrically converts the received light signal to a detection pulse and outputs the detection pulse. A driving voltage identifying circuit receives the detection pulse from the optical detector and the external driving electric signal, detects the detection voltage value of the driving electric signal then inputted each time the driving voltage identifying circuit receives the detection pulse, holds and sends the detection voltage value of one specific order for each period of the driving electric signal, and resets the detection voltage value. A control circuit receives the detection voltage value received from the driving voltage identifying circuit for each period and controls an oscillation wavelength of one of the light sources corresponding to a reference voltage value to be constant, one of the detection voltage values for the first period being used as the reference voltage value.

The driving voltage identifying circuit finds a difference between two detection voltage values of the sequentially-detected light signals corresponding to the adjacent wavelengths and externally issues an alarm when the difference is equal to or smaller than a predetermined set value.

In the aspect of the present invention, the driving electric signal is a sawtooth wave voltage signal which periodically varies between 0 and maximum to be associated with all the wavelengths of the light signals of the light sources, a detection voltage value of predetermined order received for the first period is held as the reference voltage value, the first-received detection voltage value corresponding to the reference light source is monitored for the subsequent periods to minimize a deviation from the reference voltage value, thereby controlling the wavelengths of the light sources to be constant.

DESCRIPTION OF THE PREFERRED EMBODIMENTS

The present invention will be detailed in connection with a basic arrangement of the present invention with reference to the accompanying drawings.

Figure 2:
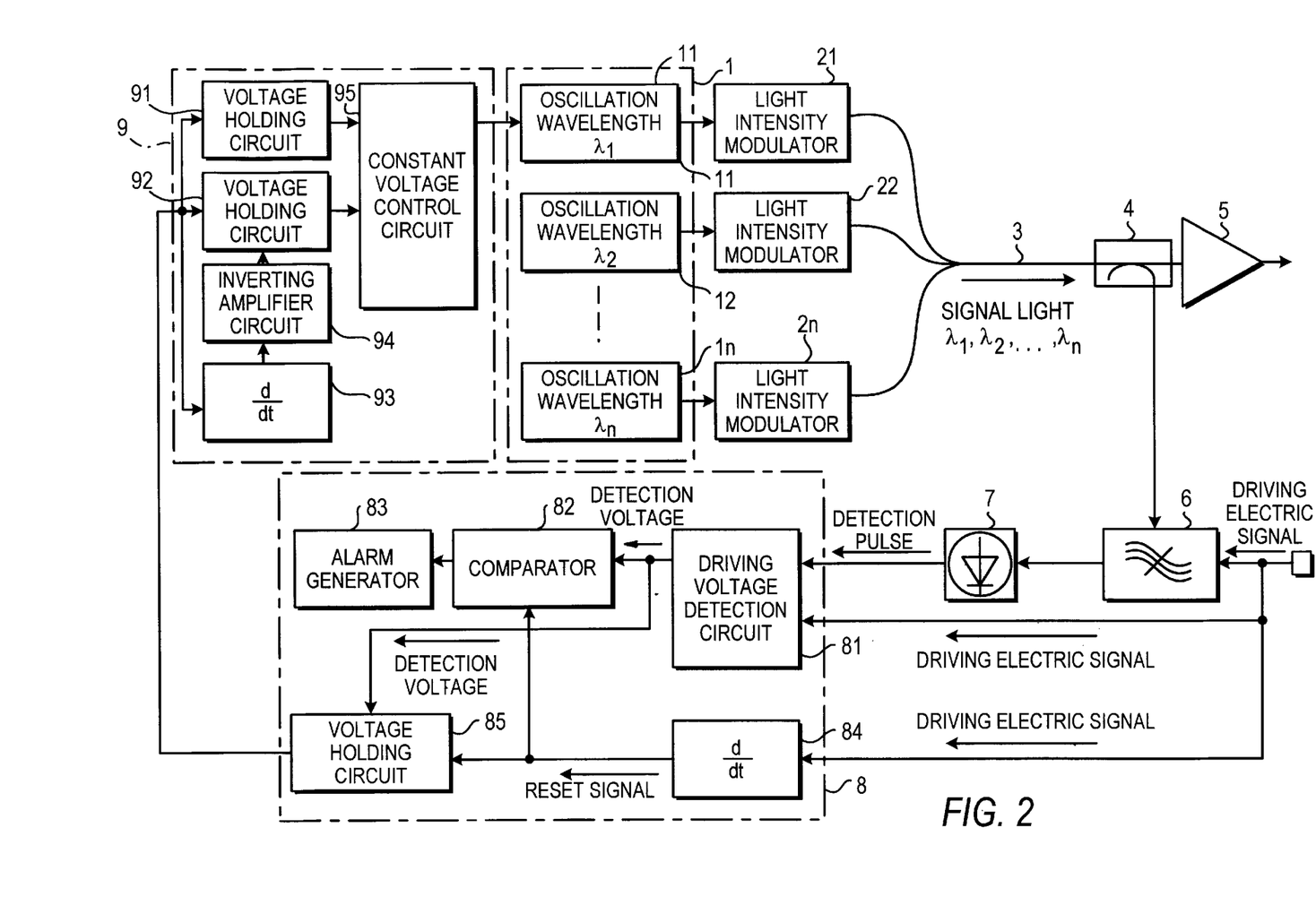
FIG. 2 is a block diagram showing the basic arrangement of the present invention.

Referring first to FIG. 2, there is shown a basic arrangement of an embodiment of the present invention. The arrangement of the present embodiment is the same as that of the prior art of FIG. 1 in that light signals issued from n light sources 11 to 11n having respective different oscillation wavelengths are optically modulated by light intensity modulators 21 to 2n, combined by optical coupler 3, amplified by optical amplifier 5, and then transmitted onto a transmission line.

The present embodiment further includes optical coupler 4 disposed between optical coupler 3 and optical amplifier 5, optical band pass filter 6 which is connected to optical coupler 4 to be driven by a driving electric signal that cyclically varies and that is externally supplied thereto, optical detector 7 for photoelectrically converting a light signal transmitted through optical band pass filter 6 and outputting a detection pulse, driving voltage identifying circuit 8 for receiving the detection pulse from optical detector 7 and the above driving electric signal to detect voltage values corresponding to the respective wavelengths $\lambda_1$ to $\lambda_n$ of light sources 11 to 11n, and control circuit 9 for controlling the wavelength of the output light signal of a predetermined reference light source to be constant on the basis of a voltage value of the reference light source received from driving voltage identifying circuit 8. Driving voltage identifying circuit 8 in turn includes driving voltage detection circuit 81 connected to optical detector 7 for inputting the driving electric signal and outputting a detection voltage, differentiating circuit 84 for inputting the driving electric signal and outputting a reset signal, voltage holding circuit 85 connected to outputs of driving voltage detection circuit 81 and differentiating circuit 84 for holding the detection voltage firstly detected after the resetting by the reset signal, comparator 82 connected to outputs of driving voltage detection circuit 81 and differentiating circuit 84, and alarm generator 83 connected to an output of comparator 82. Control circuit 9 includes a voltage holding circuit 91 for continuously holding as a reference voltage value the value of the detection voltage of the first cycle received from voltage holding circuit 85 during operation of the optical transmission apparatus; differentiating circuit 93, inverting amplifier circuit 94 and voltage holding circuit 92 for inputting the value of the detection voltage from voltage holding circuit 85 at intervals of the driving electric signal and outputting the value of the detection voltage each time; and constant voltage control circuit 95 for comparing a reference voltage value outputted from voltage holding circuit 91 with the detection voltage value outputted from voltage holding circuit 92 each time and for performing its constant value controlling operation in such a manner that a difference between both voltage values becomes minimum, that is, constant wavelength control of the reference light source (which is light source 11 having the wavelength $\lambda_1$ in the illustrated example).

Explanation will next be made as to the detailed function and operation of the present embodiment.

The light signals are issued from respective light sources 11 to 11n, subjected by light intensity modulators 21 to 2n to data modulation, and then combined by optical coupler 3. The combined light signal is partially branched by optical coupler 4 into optical band pass filter 6. Optical band pass filter 6 has such a characteristic of transmitted light wavelength varying with the voltage value of the driving electric signal externally supplied thereinto as exemplified in FIG. 4. Accordingly, when the driving electric signal (such as a sawtooth wave voltage shown in FIG. 5) continuously periodically varying between 0 and maximum is externally applied to optical band pass filter 6, the filter issues the transmitted light signal of a single wavelength then corresponding to the voltage value of the driving electric signal at intervals of each period, sequentially, e.g., in a decreasing order of wavelength for all the wavelengths, from the combined light signal of the wavelengths $\lambda_1, \lambda_2, \ldots$, and $\lambda_n$ applied to optical band pass filter 6. Assuming now that the first transmitted light signal (having the maximum oscillation wavelength $\lambda_n$ from the light source 11) is applied to optical detector 7, then optical detector 7 detects and photoelectrically converts the transmitted light signal, and outputs a detection pulse to driving voltage detection circuit 81.

Driving voltage detection circuit 81, when receiving the detection pulse from optical detector 7, detects the driving electric signal then received and thus can obtain the voltage value of the driving electric signal corresponding to the wavelength $\lambda_1$ of the transmitted light signal. Voltage holding circuit 85 holds this first-detected detection voltage value. Driving voltage detection circuit 81 further sequentially detects the voltage values corresponding to the subsequent light signals of the light sources.

Figure 6:
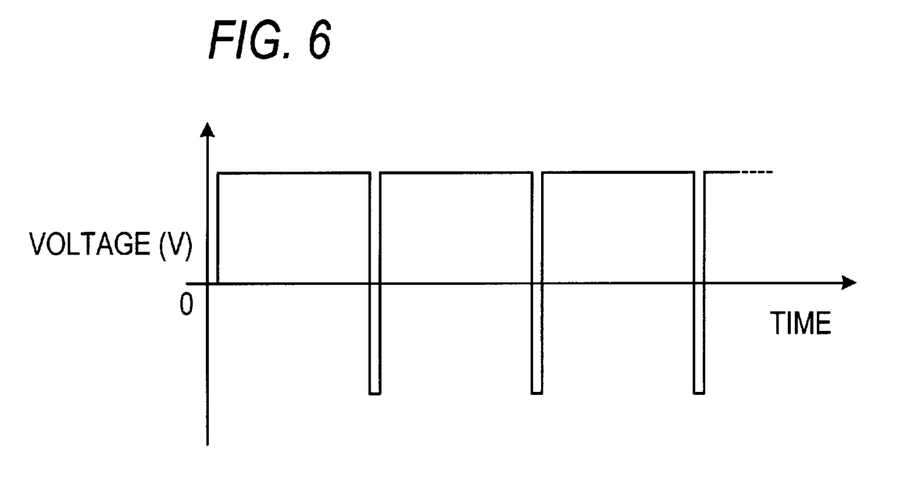
FIG. 6 is a timing chart of a reset signal outputted from differentiating circuit 84 in FIG. 3.

Meanwhile, differentiating circuit 84 inputs the driving electric signal, outputs a high level signal as shown in FIG. 6 until the driving electric signal reaches its maximum from 0, and outputs a reset signal of low level to reset the first detection voltage value held in voltage holding circuit 85 when the driving electric signal is inverted.

Figure 7:
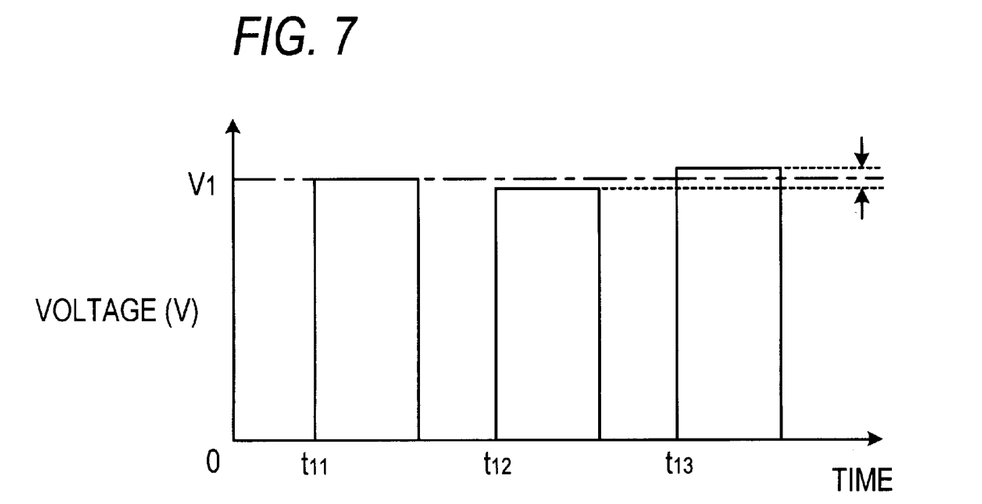
FIG. 7 is a waveform of a transition of a voltage held by voltage holding circuit 85 in the embodiment of FIG. 3.

The aforementioned operation is repeated every period of the driving electric signal, in which case the voltage value held in voltage holding circuit 85 varies as shown in FIG. 7 as an example.

Figure 8A:
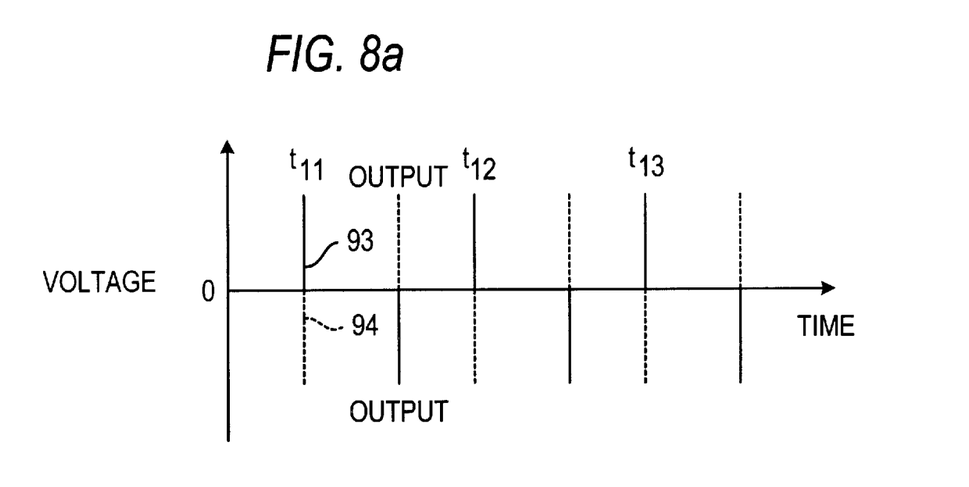
FIG. 8a is a diagram for explaining the reset signal outputted from the differentiating circuit 93 in a control circuit 9 in the embodiment of FIG. 3.
Figure 8B:
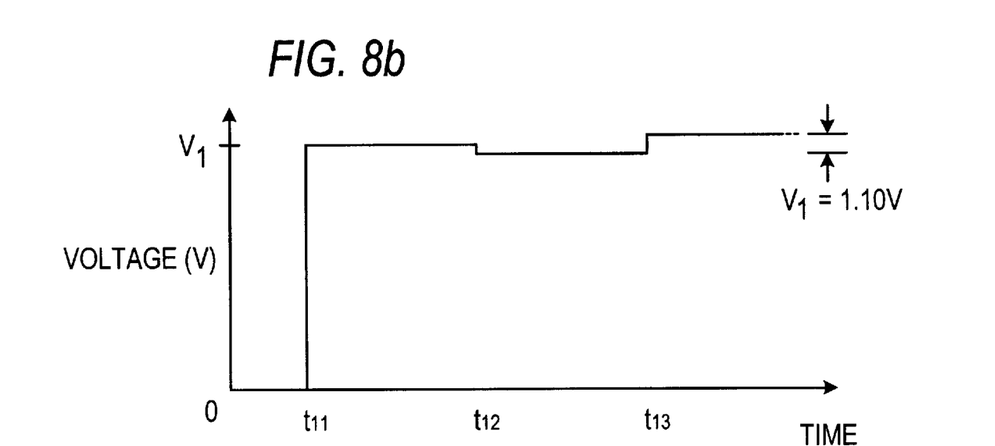
FIG. 8b is a waveform of a transition of a voltage held by voltage holding circuit 92 in control circuit 9 in the embodiment of FIG. 3.

Next, voltage holding circuit 91 of control circuit 9 continuously holds the value of the detection voltage of the first period first inputted from voltage holding circuit 85 as the reference voltage value during its operation. Differentiating circuit 93, as shown in FIG. 8a, outputs a positive pulse signal each time differentiating circuit 93 receives the detection voltage value from voltage holding circuit 85, and outputs a negative pulse signal (shown by a solid line in FIG. 8a) each time the detection voltage is reset. Inverting amplifier circuit 94 inverts the sign of the output pulse signal of differentiating circuit 93 and alternately outputs such positive and negative pulse signals as shown by dotted lines in FIG. 8a. This inverse of the positive and negative pulse signals output by differential circuit 93 is used as a reset signal to reset voltage holding circuit 92. Voltage holding circuit 92 then updates the detection voltage value received from the voltage holding circuit 85 for each period and holds it until the next resetting time (with use of the negative pulse signal received from inverting amplifier circuit 94). FIG. 8b shows a transition in the held detection voltage value. Next, constant voltage control circuit 95 continuously inputs the reference voltage value from voltage holding circuit 91 and also sequentially inputs the detection voltage value of each period from voltage holding circuit 92, and produces such an output that controls the wavelength of light source 11 and provides a minimum difference between both inputs. Accordingly, the oscillation wavelength $\lambda_1$ of reference light source 11 oscillating the light signal having the reference wavelength $\lambda_1$ is maintained at a constant value.

Comparator 82 finds a difference between adjacent two of the detection voltage values sequentially received from driving voltage detection circuit 81 and compares the difference with a set value. When the difference is equal to or smaller than the set value, comparator 82 produces such an output that operates alarm generator 83. Since alarm generator 83 can generate an external alarming sound, an operator can previously take necessary measures for it. In this case, after the light signals of all wavelengths passed through optical band pass filter 6 for each period, the reset signal is supplied from differentiating circuit 84 to comparator 82, so that there is no possibility that the comparator compares the last detection voltage value of the previous period with the first detection voltage value of the next period.

In addition, although the detection voltage value to be monitored has been employed as the detection voltage value to be first inputted after the resetting of voltage holding circuit 85 in the foregoing explanation, the detection voltage value of another order may be used.

A specific embodiment of the wavelength division multiplexing optical transmission apparatus of the present invention will be explained in detail by referring to the drawings.

Figure 3:
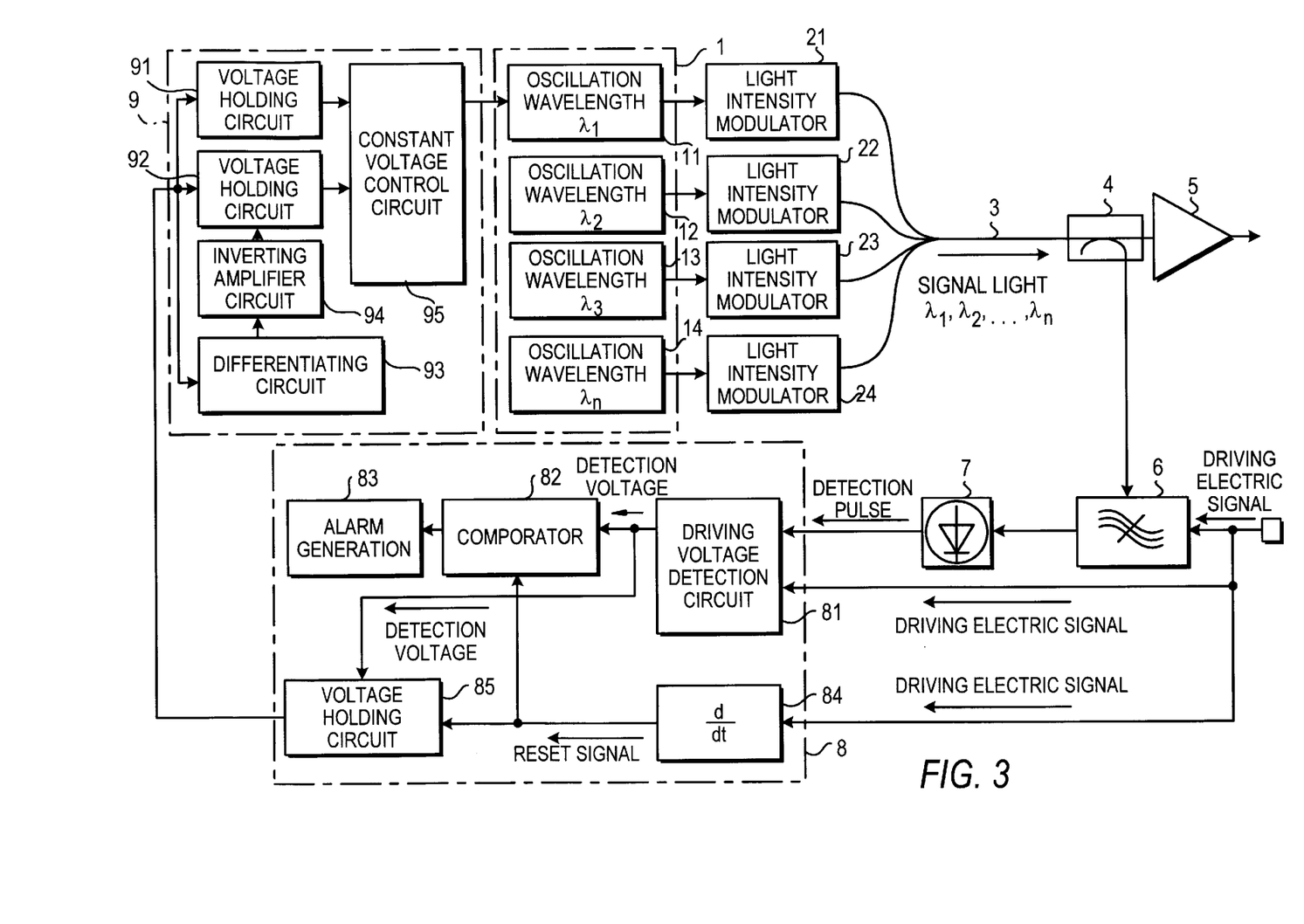
FIG. 3 is a block diagram showing the arrangement of an embodiment using 4 light sources.

Shown in FIG. 3 is an arrangement of the embodiment which uses 4 light sources 11, 12, 13 and 14.

Light sources 11 to 14 have oscillation wavelengths of 1561 nm, 1560 nm, 1559 nm and 1558 nm, respectively. The light signal corresponding to the detection voltage value first detected after comparator 82 and voltage holding circuit 85 of driving voltage identifying circuit 8 are reset by the reset signal has the largest one, i.e., 1561 nm of the oscillation wavelengths which will be explained later and thus the largest oscillation wavelength of 1561 nm is used as a reference signal wavelength. In the present embodiment, light sources 11 to 14 with a built-in thermistor, can control the oscillation wavelength of a laser chip based on the temperature thereof when externally supplied with a voltage. Light intensity modulators 21, 22, 23 and 24 are all of a $LiNbO_3$ waveguide type and perform data modulation at a bit rate of 2.66 Gbit/sec. Optical coupler 4 has a branching ratio of 10:1 and optical amplifier 5 is of an Er-doped type having an maximum output +23 dBm.

Optical band pass filter 6 is of a variable wavelength, motor-driven type wherein an optical filter with a light transmission characteristic having a single peak is fixed to a magnet movable part and the magnet movable part is spatially rotated by a driving electric signal. Its variable wavelength range is between 1530 and 1570 nm, the driving electric signal varies between 0 and +2.5V in its voltage value, optical band pass filter 6 has a narrow band of 0.2 nm in half-width and also has a variable wavelength range sufficient with respect to all the light signals. Optical detector 7 uses a photodiode of InGaAs-PIN. The elements of driving voltage identifying circuit 8 comprise a digital IC, an operational amplifier IC, etc.

The operation of the present embodiment will then be explained.

Figure 4:
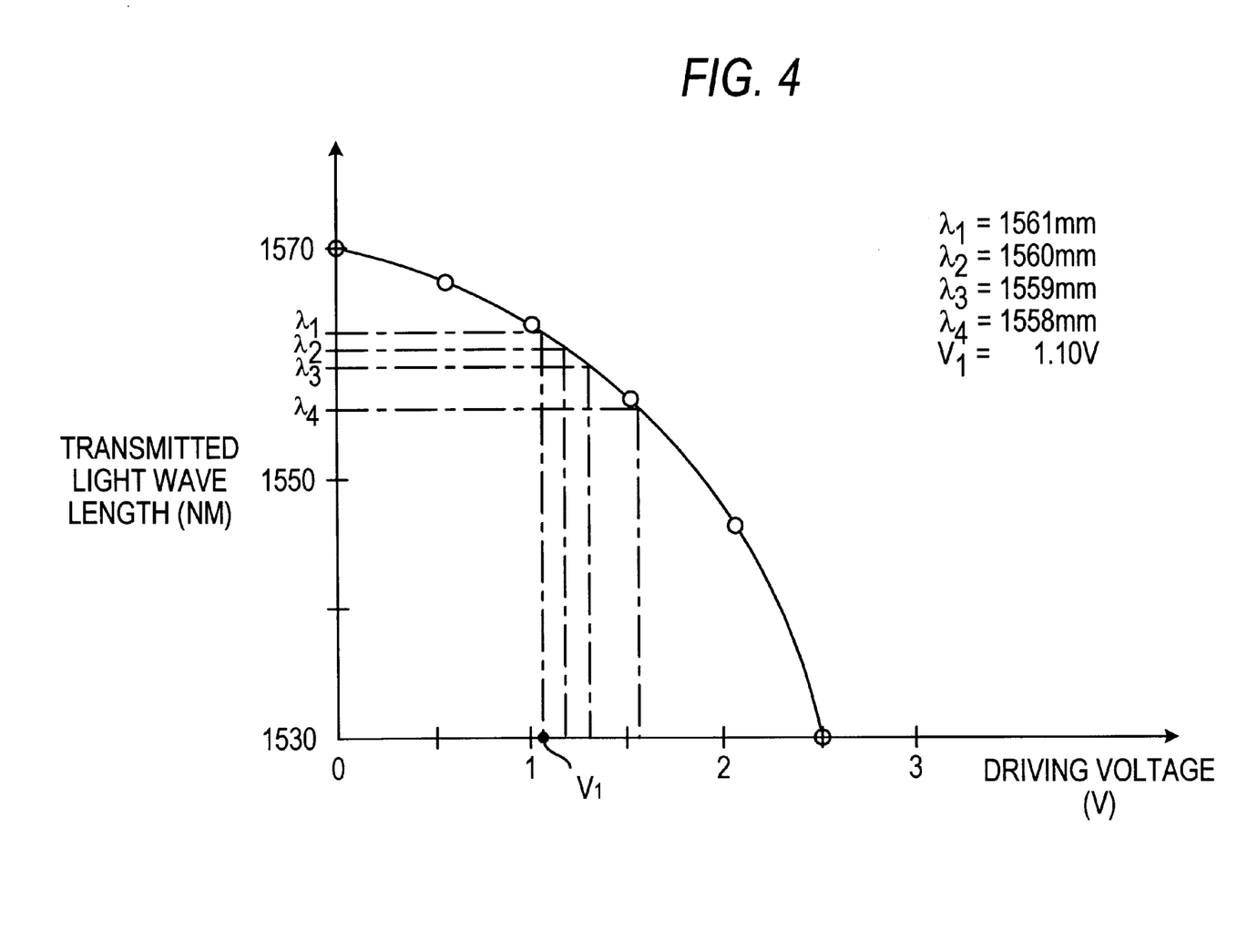
FIG. 4 is a characteristic curve diagram showing a relationship between a transmitted light wavelength and a driving electric signal voltage of an optical band pass filter in FIG. 3.

FIG. 4 is a transmitted light wavelength characteristic of the optical band pass filter of the variable wavelength, motor-driven type used in the present embodiment showing a relationship between an electric voltage signal for driving the filter and a transmitted light wavelength, wherein, as the value of the driving voltage increases, the wavelength of light transmitted through the optical band pass filter is decreased.

Figure 5:
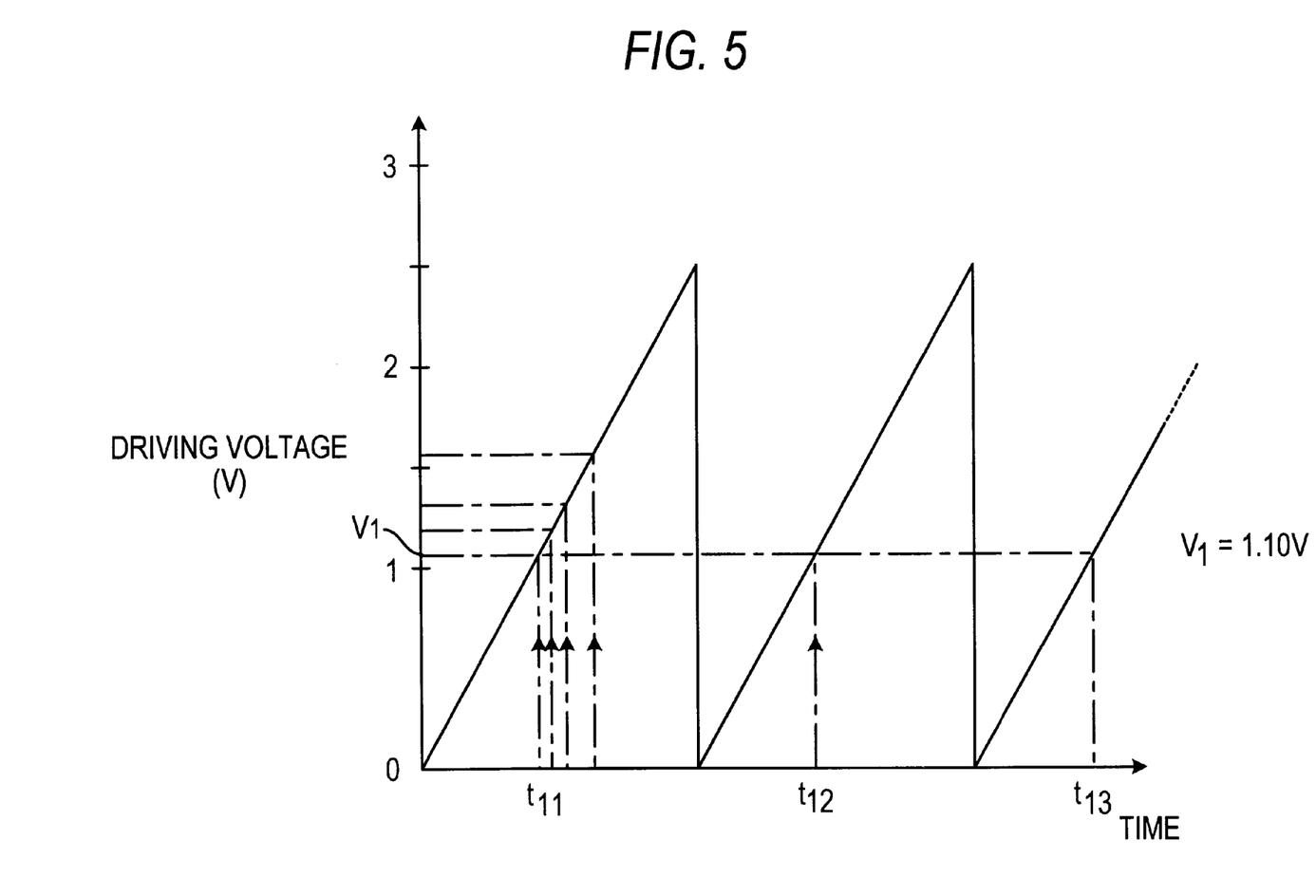
FIG. 5 shows a waveform of the driving electric signal used in the embodiment of FIG. 3.

FIG. 5 is a waveform of an external driving electric signal used in the present embodiment. In the illustrated example, the driving signal is of a sawtooth shape which oscillates between 0 and +2.5V. Therefore, at time $t_{11}$, at which the value of the driving electric voltage signal reaches a value $V_1$ of the driving electric signal corresponding to the oscillation wavelength $\lambda_1$ of reference light source 11, the optical band pass filter outputs only the light signal having the wavelength $\lambda_1$. In this way, as the value of the driving electric signal increases, the optical band pass filter sequentially outputs the light signals having the oscillation wavelengths of $\lambda_1$, $\lambda_2$, $\lambda_3$ and $\lambda_4$ in an decreasing order of the oscillation wavelengths. As already explained above, the voltage value $V_1$ corresponding to the first one (having the wavelength $\lambda_1$) of these light signals is held in voltage holding circuit 85 at time $t_{11}$.

Shown in FIG. 6 is a timing chart of an output signal of differentiating circuit 84. When the driving electric signal reaches its maximum value of 2.5V after passage of the light signals of all the wavelengths through the filter, the driving electric signal has a negative gradient and thus differentiating circuit 84 outputs a negative voltage which in turn is used as the reset signal to reset comparator 82 and voltage holding circuit 85.

FIG. 7 is a timing chart of the first-detected value of the driving voltage signal held in voltage holding circuit 85. As already explained in the foregoing, at time $t_{11}$, at which the voltage value of the driving electric signal reaches $V_1$ (=1.10V), the voltage value is held in voltage holding circuit 85, and the voltage is reset by the reset signal. Since the voltage value held in voltage holding circuit 85 is constant about 1.10V, it will be understandable that control circuit 9 is normally functioning. It has also been confirmed that, when the voltage set value of comparator 82 is increased, this causes generation of an alarm from alarm generator 83.

As has been explained in the foregoing, in accordance with the present invention, the light signals in the combined signal transmitted onto the transmission line are continuously monitored with one of the light signals used as the reference, the oscillation wavelength of the reference light source is subjected to feedback control so that the oscillation wavelength becomes always constant, and the light signals of the light sources other than the reference light source are also monitored always with respect to their mutual interval of the oscillation wavelengths. As a result, even when deterioration of the light sources with the lapse of time causes variations of the oscillation wavelengths, there can be realized a wavelength division multiplexing optical transmission apparatus which can always correct the variations stably.

What is claimed is:

1. A wavelength division multiplexing optical transmission apparatus for modulating light signals emitted from a plurality of light sources having respective different oscillation wavelengths with individual electric signals with respect to light intensity, combining these light signals into a single combined light signal and then transmitting the combined light signal onto a transmission line; said apparatus comprising:

an optical coupler for branching part of the combined light signal;

an optical band pass filter having a function of determining a wavelength of a transmitted light signal according to a driving voltage value of a periodically-varying driving electric signal externally supplied thereto and for passing therethrough light signals each having a single wavelength from the combined light signal received from said optical coupler in a predetermined wavelength order of all the wavelengths according to the driving voltage value of said periodically-varying driving electric signal;

an optical detector, when receiving said transmitted light signal from said optical band pass filter, for photoelectrically converting the received light signal to a detection pulse and outputting the detection pulse;

a driving voltage identifying circuit for receiving the detection pulse from said optical detector and said external driving electric signal, detecting the detection voltage value of the driving electric signal each time the driving voltage identifying circuit receives the detection pulse, holding and sending the detection voltage value of one specific order for each period of the driving electric signal, resetting the detection voltage value, finding a difference between two sequentially-detected detection voltage values corresponding to the adjacent wavelengths of the light signals, and externally issuing an alarm when the difference is equal to or smaller than a set value; and a control circuit for receiving the detection voltage value received from said driving voltage identifying circuit for each period and for controlling an oscillation wavelength of one of the light sources corresponding to a reference voltage value to be constant, one of the detection voltage values for the first period being used as said reference voltage value.

2. A wavelength division multiplexing optical transmission apparatus as set forth in claim 1, wherein said driving voltage identifying circuit includes a driving voltage detection circuit for detecting the detection voltage value of the driving electric signal then inputted each time the driving voltage detection circuit receives the detection pulse to associate one of the oscillation wavelengths of the light sources with one of the detection voltage values, a first voltage holding circuit for holding and sending one of the detection voltage values corresponding to one of the light signal wavelengths in said specific order, a comparator for sequentially receiving the detection voltage values detected by said driving voltage detection circuit, comparing adjacent two of the detection voltage values to find a difference therebetween and outputting an output when the difference is smaller than a predetermined set value, an alarm generator activated by said output of said comparator for externally issuing an alarm, and a differentiating circuit for detecting the period of the driving electric signal and resetting said voltage holding circuit and comparator for each detected period.

3. A wavelength division multiplexing optical transmission apparatus as set forth in claim 1, wherein said driving electric signal is a sawtooth wave signal which periodically varies between 0 and its maximum and is capable of being associated with all the wavelengths of the light signals of the light sources.

4. A wavelength division multiplexing optical transmission apparatus as set forth in claim 1, wherein said specific order is the top of the periodical detection order of the detection voltage values.

5. A wavelength division multiplexing optical transmission apparatus as set forth in claim 2, wherein said driving electric signal is a sawtooth wave signal which periodically varies between 0 and its maximum and is capable of being associated with all the wavelengths of the light signals of the light sources.

6. A wavelength division multiplexing optical transmission apparatus as set forth in claim 2, wherein said specific order is the top of the periodical detection order of the detection voltage values.

7. A wavelength division multiplexing optical transmission apparatus as set forth in claim 2, wherein said control circuit includes a second voltage holding circuit for receiving the detection voltage value of the first period from said first voltage holding circuit after operation is started and holding the detection voltage value as a reference voltage value, a third voltage holding circuit for sequentially receiving the detection voltage values from said first voltage holding circuit to periodically update and hold the detection voltage values, a differentiating circuit for detecting the updating timing of the detection voltage value received from said first voltage holding circuit and outputting a detection signal, an inverting amplification circuit for inverting said detection signal to update the detection voltage value held in said third voltage holding circuit as a reset signal, and a constant voltage control circuit for controlling the oscillation wavelength of one of the light signals of the light sources corresponding to said reference voltage value to be constant so that the detection voltage values from said third voltage holding circuit come to be equal to said reference voltage value from said second voltage holding circuit.

* * * * *